May 27, 1952     A. RAPPL     2,598,601
WINDSHIELD CLEARING SYSTEM
Filed Feb. 5, 1947
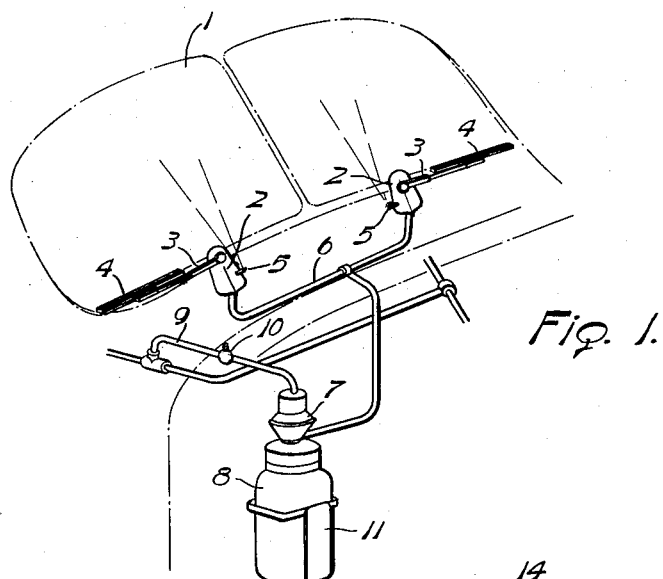
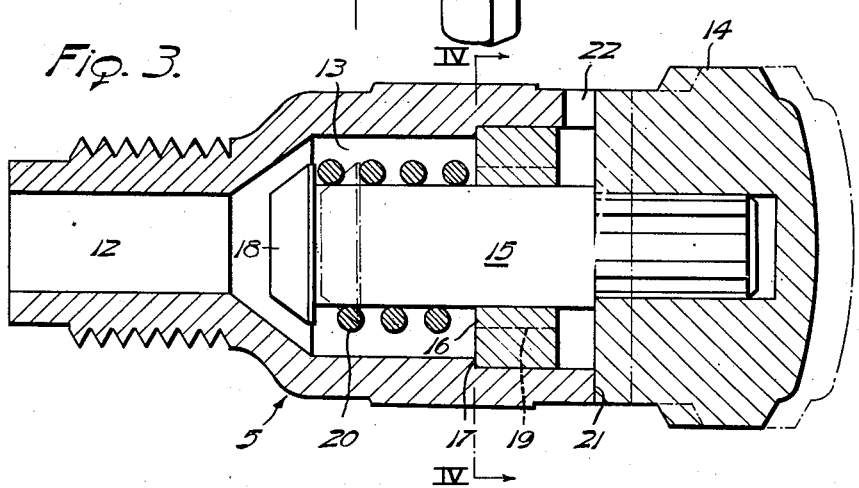
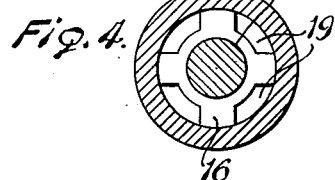
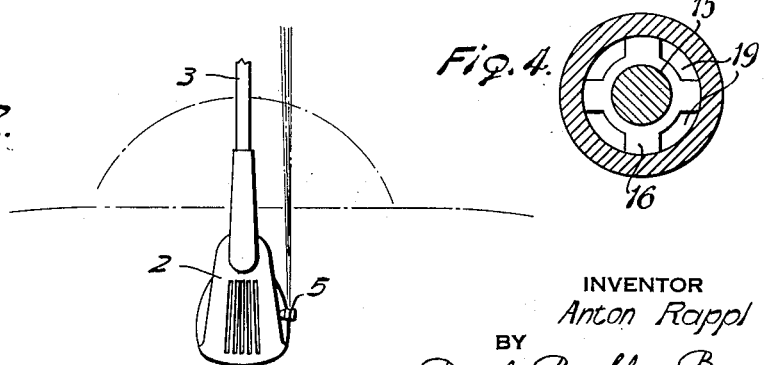
INVENTOR
*Anton Rappl*
BY
*Bean, Brooks, Buckley & Bean*
ATTORNEYS Patented May 27, 1952

2,598,601

UNITED STATES PATENT OFFICE 2,598,601

WINDSHIELD CLEARING SYSTEM

Anton Rappl, Eggertsville, N. Y., assignor to Trico Products Corporation, Buffalo, N. Y.

Application February 5, 1947, Serial No. 726,522

3 Claims. (Cl. 299—59)

This invention relates to the windshield cleaning art and particularly to an apparatus for applying water or other liquid solvent to the windshield for assisting the reciprocating wiper in mechanically removing vision obscuring matter from the surface thereby to maintain a clear field of vision for the safe operation of the motor vehicle. A device of this character is found in practical use on the present day motor vehicle. In such device the stream of fluid is delivered into the path of the wiper in the form of a very small stream or fine spray which obviously necessitates the use of a minute orfice in the discharge nozzle. Therefore, any foreign matter in the liquid reservoir would eventually find its way to the nozzle and clog such discharge orifice.

The object of the present invention is to provide a system of this character by which the nozzle may be kept clean to insure maximum efficiency of the apparatus.

Further, the invention resides in an arrangement by which the system may be flooded or washed clean of clogging impurities in the liquid in a practical and effective manner.

The foregoing and other objects will manifest themselves as the description progresses, reference being had to the accompanying drawing, wherein Fig. 1 is a fragmentary perspective view depicting a windshield spraying system embodying the present invention;

Fig. 2 is a fragmentary front elevation of the windshield cleaner fitting equipped with a discharge nozzle;

Fig. 3 is an enlarged sectional view more clearly depicting the nozzle flooding characteristic; and Fig. 4 is a transverse sectional view about on line IV—IV of Fig. 3.

Referring more particularly to the drawing, the numeral 1 designates the windshield of a motor vehicle. At the lower side of the shield is arranged a pair of fittings or housings 2 in which are journaled the wiper carrying arms 3 of the conventional automatic windshield cleaner by which the wiper 4 is oscillated back and forth over the windshield transparency. Each housing 2 is equipped with a nozzle 5 which in turn is connected by a conduit 6 to the outlet side of a pump 7. This pump may be in the form of that shown in Patent 2,142,056, wherein a liquid displacing diaphragm is backed by a spring for delivering a charge of liquid to the nozzle, the charge being initially withdrawn from a reservoir 8 when the pump is momentarily opened to a suction supply line 9 of an accessory system by means of a valve 10. The reservoir may be suitably mounted on the fire wall or dash of the vehicle body by means of a bracket 11.

The delivery nozzle is shown in the enlarged sectional showing of Fig. 3 as comprising a cup-shaped body with an inlet passage 12 opening through one end into a relatively larger chamber 13. The opposite end of the chamber is open and normally closed by a flushing member having a head 14 mounted on a stem 15 that has sliding support in a spider 16 seating on an internal shoulder 17 within the chamber 13. The inner free end of the stem 15 carries a somewhat tapered plug 18 which opposes the inlet passage 12 but overhangs the margin thereof to serve normally in the capacity of a metering valve which diverts the inflowing liquid toward the side wall of the chamber 13 in line with the openings 19 through the spider 16. The plug 18 also constitutes a cleaning means for maintaining the chamber clean. A spring 20 coiled about the stem 15 and interposed between the flow directing plug 18 and the spider 16 serves normally to hold the head 14 on its seat as provided by the rim 21 about the open end of the chamber 13.

The side or cylindrical wall of the chamber 13 is provided with a radial recess 22 which opens through the rim 21 and with which the head 14 normally cooperates to define a discharge orifice. This orifice is directed upwardly so as to deliver the spray onto the windshield 1 and in the path of the oscillating wiper 4. The size of the orifice, relative to the inlet passage 12 and the chamber 13, is very small although in the enlarged view of Fig. 3 it has been exaggerated for clarity.

The reservoir 8 in practice is provided with a refill opening by which the service station attendant may readily fill the same. Impurities in the water may finally lodge in the discharge orifice and clog the passage of water therethrough. To clean the orifice it is only necessary to pull the head 14 outwardly and thereby permit the water in larger volume to flow freely through the open end of the chamber in a flushing manner. Upon its release, the head reseats under the urge of the coil spring and again confines the escaping water to the orifice alone.

This flushing operation does not disturb the position of the discharge orifice but merely enables a flushing of the water channel, and since the water is being expressed outwardly by the spring urged diaphragm of the pump it will be apparent that the released head of water will gush out with such force as to carry along therewith the orifice clogging matter. Especially will this be true in the illustrated nozzle because the discharge orifice opens out through the rim 21 and therefore the water will spread out thereover and carry with it the clogging matter.

The foregoing description has been given in detail for ease of understanding only, since the inventive principles involved are capable of assuming other physical embodiments without departing from the spirit of the invention and the scope of the appended claims.

What is claimed is:

1. A windshield washer, having a nozzle having a delivery orifice, pressure means connected to the nozzle and operable to feed a predetermined volume of liquid to the nozzle for discharge therefrom, and a spring retracted cleaning plug within the nozzle normally defining an interval passage and capable of being withdrawn to enlarge the passage for flushing out the orifice.

2. A nozzle having a body with a chamber open at its forward end and closed at its opposite end by a wall having an inlet into the chamber, the forward end of the chamber having an encircling rim interrupted by a recess therein, and a flushing member having a head seating on the rim and a stem carrying the head and extending into the chamber, a support in the chamber on which the stem is slidably supported, an internal enlargement on the stem opposing the chamber inlet to serve as a metering valve for determining a restricted normal flow passage through the nozzle, the head when seating on the rim overhanging the rim recess to define therewith a delivery orifice from the chamber, said flushing member being axially displaceable from a normal position to unseat the head and to remove the passage-restricting enlargement from its normal position to increase the capacity of the flow passage for flushing the nozzle.

3. A nozzle having a body with a chamber open at its forward end and closed at its opposite end by a wall having an inlet into the chamber the forward end of the chamber having an encircling rim interrupted by a recess therein, and a flushing member having a head seating on the rim and a stem carrying the head and extending into the chamber, a support in the chamber on which the stem is slidably supported, an internal enlargement on the stem opposing the chamber inlet to serve as a metering valve for determining a restricted normal flow passage through the nozzle, the head when seating on the rim overhanging the rim recess to define therewith a delivery orifice from the chamber, said flushing member being axially displaceable from a normal position to unseat the head and to remove the passage-restricting enlargement from its normal position to increase the capacity of the flow passage for flushing the nozzle, there being provided a spring acting on the flushing member yieldably to hold it in its normal position.

ANTON RAPPL.

REFERENCES CITED

The following references are of record in the file of this patent:

UNITED STATES PATENTS

| Number | Name | Date |
|---|---|---|
| 444,940 | Oehlmann | Jan. 20, 1891 |
| 537,236 | Savill | Apr. 9, 1895 |
| 564,610 | Gill | July 28, 1896 |
| 1,342,486 | Wolfard | June 8, 1920 |
| 1,822,047 | Leask | Sept. 8, 1931 |
| 2,049,141 | Schneider | July 28, 1936 |
| 2,069,150 | Holder | Jan. 26, 1937 |
| 2,126,624 | Eaddy | Aug. 9, 1938 |
| 2,142,056 | Horton | Dec. 27, 1938 |